United States Patent [19]

Edelman

[11] 4,032,362
[45] June 28, 1977

[54] METHOD OF STRIPPING THERMOSET POLYMERS WITH MOLTEN LACTAMS

[75] Inventor: Leonard E. Edelman, Penn Hills, Pa.

[73] Assignee: Westinghouse Electric Corporation, Pittsburgh, Pa.

[22] Filed: Dec. 23, 1975

[21] Appl. No.: 643,720

[52] U.S. Cl. .................................. 134/38; 134/42
[51] Int. Cl.² ........................................ B08B 3/08
[58] Field of Search .............. 134/2, 38, 42, 22 R; 252/542, 364, DIG. 8; 260/239.3 R, 239.3 A, 30.2; 156/344

[56] References Cited

UNITED STATES PATENTS

| 2,939,209 | 6/1960 | Schwartz | 134/38 X |
|---|---|---|---|
| 3,185,656 | 5/1965 | Gabler et al. | 260/30.2 |
| 3,669,740 | 6/1972 | Yamamoto et al. | 134/38 X |
| 3,764,384 | 10/1973 | Berni | 134/22 R X |

*Primary Examiner*—S. Leon Bashore
*Assistant Examiner*—Marc L. Caroff
*Attorney, Agent, or Firm*—R. D. Fuerle

[57] ABSTRACT

Thermoset aromatic ethers and other thermoset polymers are stripped from an article by immersing the article in a molten compound of the general formula:

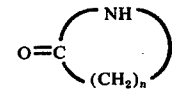

where *n* is an integer from 5 to 7. Caprolactam is an especially useful stripping compound.

9 Claims, 2 Drawing Figures

METHOD OF STRIPPING THERMOSET POLYMERS WITH MOLTEN LACTAMS

BACKGROUND OF THE INVENTION

Defective motors are repaired by removing the conductor coils from the magnetic iron core and rewinding the core. The coils are, of course, insulated, and are usually held in place by varnish impregnant, wedges, and end blocks. This material, which consists largely of thermoset resins, must be removed or destroyed in order to remove the coils. The usual practice is to burn out the thermoset resins. Burning, however, produces pollutants, uses energy, and leaves a char which is difficult to remove.

An alternative procedure is to immerse the motor in a stripper composition. Commercial strippers, however, swell the resin without destroying it, and a swelled resin may be no easier to remove than an unswelled resin.

PRIOR ART

U.S. Pat. No. 3,669,740 removes polyamides with carboxylic acids at temperatures over 200° C, then washes off the waste carboxylic acid with lactam.

SUMMARY OF THE INVENTION

I have found that many thermoset polymers including aromatic ethers can be effectively removed from articles by immersing the articles in molten lactam. To the best of my knowledge, aromatic ethers are not attacked by any other known stripper.

The lactam does not merely swell the resin, but rather it attacks the resin by breaking the polymers into smaller molecules which are soluble, whereas the polymer is not.

The lactam produces very little pollution since vapors are condensed and returned. It is apparently of low toxicity and does not attack common metals such as iron, copper, and aluminum, nor does it attack glass or cellulose. Also, it has no apparent effect on the interlaminar insulation of electrical equipment. It works rapidly, in most cases requiring only a few hours to strip a motor stator or rotor, and uses less energy than does burning the insulation.

DESCRIPTION OF THE INVENTION

The stripper used in this invention is a lactam, that is, a compound of the general formula

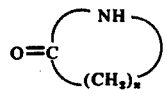

where $n$ is an integer from 5 to 7. Preferably $n$ is 5, because that compound, caprolactam, is less expensive and more readily available than other lactams. If $n$ is below 5 the lactam is too low boiling and if $n$ is more than 7 the lactam is less effective and too expensive.

Compounds which become lactams at the temperature of use, such as amino-caproic acid, are considered to be equivalent and may also be used. Mixtures of lactams are also contemplated.

The stripper will attack phenolics, polyesters, epoxies, and diphenyl oxide resins, and may attack other thermoset resins it has not yet been tested on. However, it is especially useful in stripping diphenyl oxide (i.e., aromatic ether) resins as they are not attacked, as far as is known, by any other stripper. The thermoset aromatic ether polymers which are attacked by the stripper are polymers having an ether linkage in the backbone of the polymer chain. Examples include the polymer sold by Westinghouse Electric Corporation under the trademark "Doryl," or the polymer sold by Ciba-Gigy under the trademark "Xylok," which contain the repeating unit

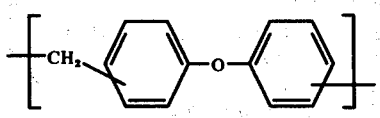

The lactam must be molten at the temperature of use. Caprolactam melts at 68°–69° C, but a temperature of 200° to 250° C is preferred as it is faster yet not so high as to cause problems with vapors. Temperatures as low as 150° C may be used, but longer stripping times are required at these lower temperatures.

The object to be stripped is immersed into the stripper until it has been observed to be stripped. If the object is a motor stator or rotor, it is first prepared by sawing off the ends of the coils. If the rotating apparatus is form wound it may not be necessary to cut the ends, but mush wound apparatus must be cut at at least one end.

Figure 1:
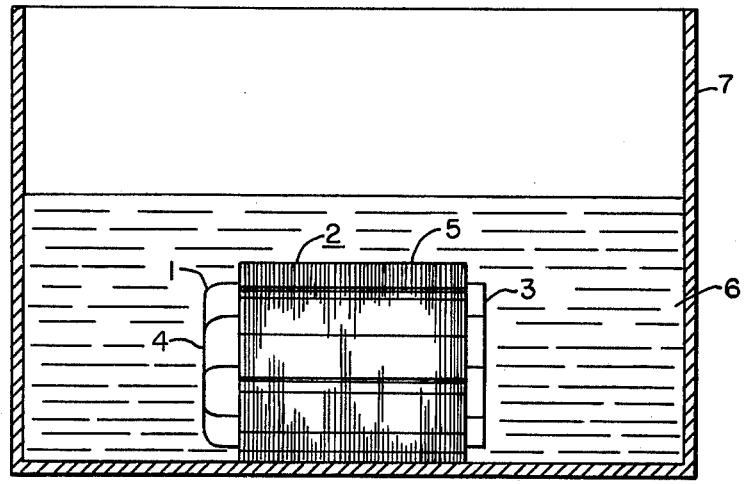
FIG. 1 is a cross-sectional view of a motor stator immersed in a lactam stripper according to this invention.

In FIG. 1 coils 1 of stator 2 have been cut at 3. The other end of the coils 4 has not been cut to provide something to grasp while pulling the coils from laminated core 5. The stator is immersed in stripper 6 held in tank 7. The length of time required to strip an article depends upon the accessability of the polymer to attack, its age, thickness, and degree of cure, but about 1½ to about 3 hours is typical, although as long as 6 hours may be required to strip a motor coil.

Figure 2:
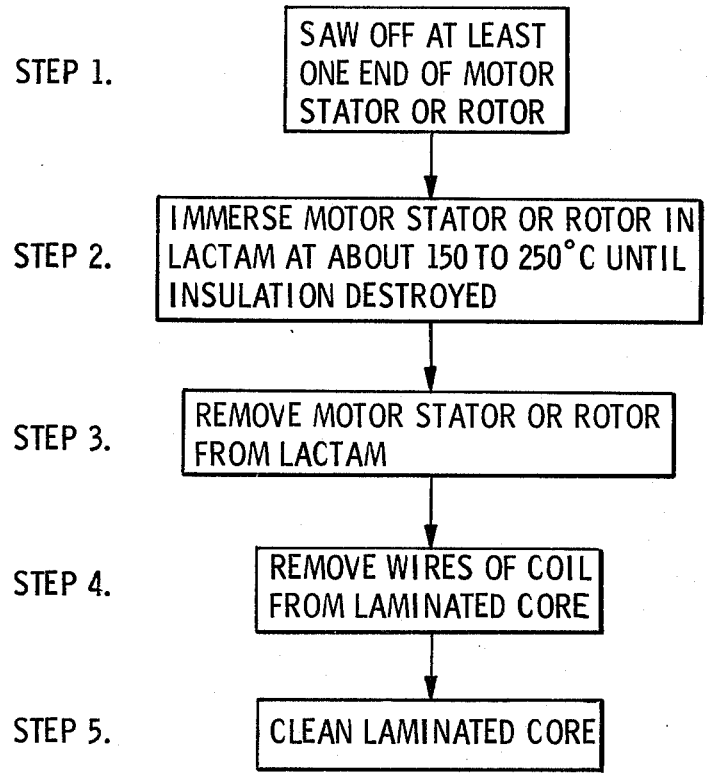
FIG. 2 is a flow chart of the process of this invention.

The stripped object is removed, drained, cooled, and washed with water or other common solvents. FIG. 2 shows the steps involved in removing coils from a motor stator or rotor using the process of this invention. In FIG. 2 steps 3 and 4 can be reversed.

While the stripper was especially designed for stripping motors, it can also be used to strip generators, transformers, and other electrical conductors insulated with thermoset resins. The stripper can also be used on laminates to determine the amount of filler they contain, to clean objects contaminated with resins, or for other purposes.

The stripper may be renewed from time to time by the addition of fresh stripper. It may also be filtered occasionally to remove suspended particles.

The following example further illustrates this invention.

EXAMPLE

Five glass-reinforced laminates, one based on a phenolic resin, one on a polyester resin, one on an epoxy resin, one on a diphenyl oxide resin, and one on an unknown thermosetting resin were placed in caprolactam for 3 hours at 240° to 250° C. All of the laminates were completely delaminated and the resin removed from the glass.

I claim:

1. A method of removing a thermoset polymer deposited on an article comprising immersing the article in a molten compound having the general formula

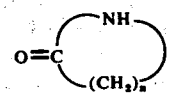

where $n$ is an integer from 5 to 7.

2. A method according to claim 1 wherein $n = 5$.
3. A method according to claim 1 wherein said thermoset polymer is an aromatic polyether.
4. A method according to claim 1 wherein said molten compound is at about 200° to about 250° C.
5. A method according to claim 1 wherein said article is a electrical apparatus having coils of insulted wires imbedded in a laminated core.
6. A method according to claim 5 including the initial step of severing at least one end of said coils.
7. A method according to claim 1 including the additional last steps of removing said article from said molten compound and cleaning said molten compound off said article.
8. A method of removing the coils from a electrical apparatus having coils of wire insulated with a thermoset resin imbedded in a laminated core comprising:
   1. severing at least one end of said coils;
   2. immersing said apparatus in a lactam heated between about 150° and about 250° C which has the general formula

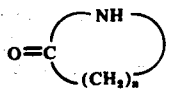

where $n$ is an integer from 5 to 7;
   until the insulation of said coils is substantially destroyed;
   3. in either order (a) removing said laminated core from said lactam and (b) removing the wire of said coils from said laminated core; and
   4. cleaning said lactam off said laminated core.
9. A method according to claim 8 wherein said cleaning step comprises washing with water.

* * * * *